United States Patent [19]

Niksa et al.

[11] Patent Number: 4,925,744
[45] Date of Patent: May 15, 1990

[54] PRIMARY ALUMINUM-AIR BATTERY

[75] Inventors: Marilyn J. Niksa; Andrew J. Niksa, both of Concord; Jay M. Noscal, Jefferson, all of Ohio

[73] Assignee: Eltech Systems Corporation, Boca Raton, Fla.

[21] Appl. No.: 335,005

[22] Filed: Apr. 7, 1989

[51] Int. Cl.⁵ .......................................... H01M 12/06
[52] U.S. Cl. ........................................ 429/27; 429/29; 429/34; 429/86; 429/210; 429/26
[58] Field of Search .................... 429/27, 29, 26, 34, 429/38, 72, 86, 210

[56] References Cited

U.S. PATENT DOCUMENTS

| | | | |
|---|---|---|---|
| 3,717,505 | 2/1973 | Unkle, Jr. | 429/27 |
| 4,246,324 | 1/1981 | de Nora et al. | 429/17 |
| 4,389,466 | 6/1983 | Joy | 429/27 |
| 4,626,482 | 12/1986 | Hamlen et al. | 429/27 |

Primary Examiner—Anthony Skapars
Attorney, Agent, or Firm—John J. Freer

[57] ABSTRACT

An aqueous electrolyte aluminum-air battery comprises one or more cells, each cell comprising a frame which defines an electrolyte chamber. The frame is made of a rigid material inactive to the electrolyte. The cell has a consumable aluminum anode and an air cathode spaced from the anode by said electrolyte chamber. Means are provided for admitting electrolyte solution into the electrolyte chamber. A vent exposes the electrolyte chamber to atmosphere. A hydrophobic membrane which is impermeable to the passage of the electrolyte but permeable to the passage of hydrogen closes the vent. A surface of each cell anode is exposed to the flow of air. The amount of surface exposed is effective to dissipate heat generated at the anode.

30 Claims, 3 Drawing Sheets

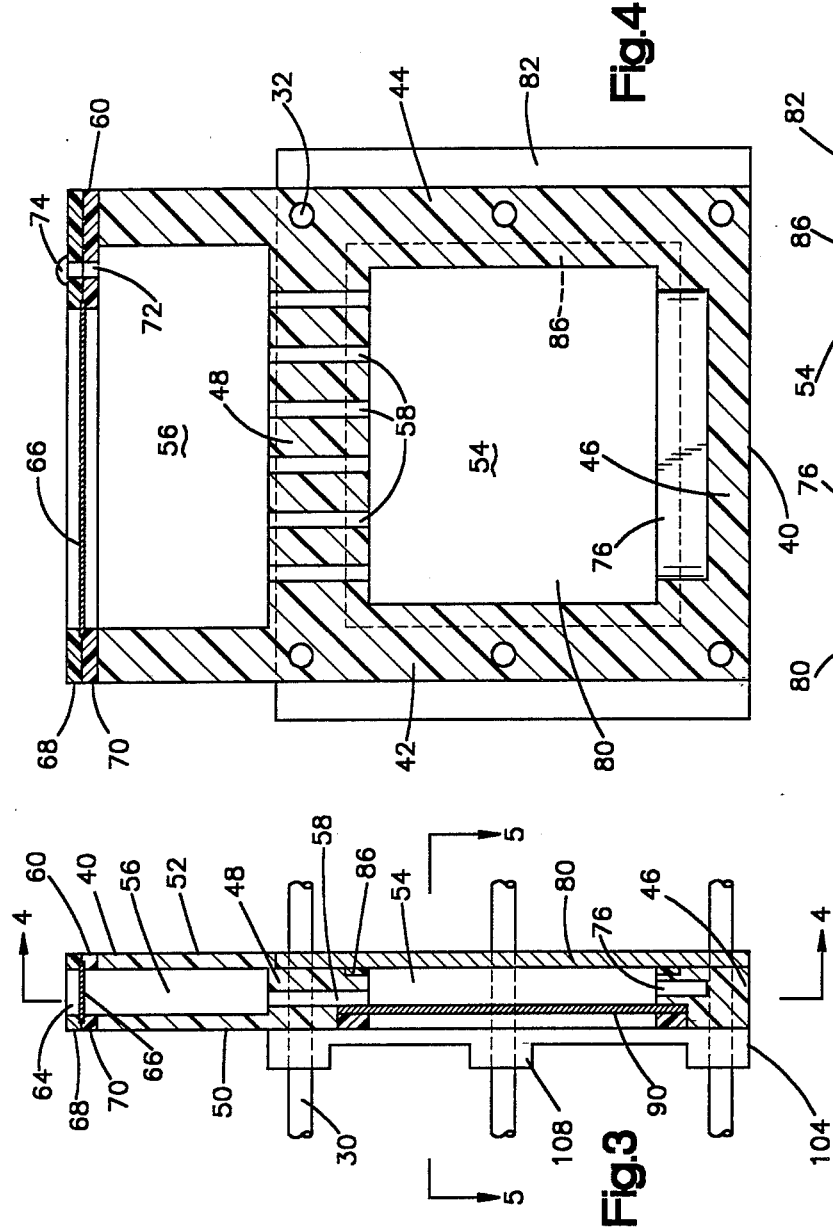

PRIMARY ALUMINUM-AIR BATTERY

BACKGROUND OF THE INVENTION

The present invention relates to a primary, aluminum-air battery and to a novel cell for such battery comprising a consumable reactive aluminum anode and an air cathode. The battery of the present invention remains inactive until a liquid electrolyte, such as an alkali electrolyte as exemplified by sodium hydroxide or potassium hydroxide, is introduced into the space of each cell between the aluminum anode and the air cathode. The cells of the present invention are mechanically rechargeable, e.g., by replacement of a spent aluminum anode with a fresh anode, or by addition of fresh electrolyte, typically after removal of spent electrolyte, or by replacement of both anode and electrolyte.

DESCRIPTION OF THE PRIOR ART

U.S. Pat. No. 4,246,324 discloses a plurality of box-like elements each used to support an air cathode and a replaceable, consumable metal anode in spaced relationship with the air cathode. The elements are positioned within an outer tank which holds an aqueous electrolyte. Air, oxygen or other depolarizing gas is circulated through the interior of each of the box-like elements to each air cathode. The air cathodes have a surface impregnated with a hydrophobic material to make the cathode substantially impervious to the aqueous electrolyte. The gas pressure within the box-like elements is regulated so that liquid electrolyte does not flood the pores of the cathode. It is indicated in the patent that zinc is the preferred anode material, but that other consumable anodic materials such as iron, lithium, and cadmium can be used.

A similar arrangement of components in which the electrolyte is contained within a tank, and the electrodes are suspended within the electrolyte, is disclosed in U.S. Pat. No. 4,389,466. A preferred anode metal in U.S. Pat. No. 4,389,466 is aluminum.

An aluminum-air battery which is commercially available and is disclosed in U.S. Pat. No. 4,626,482 comprises essentially an open vessel which contains an aqueous salt electrolyte. An aluminum anode and the air cathode are suspended in the electrolyte. The electrolyte is added to the vessel at the time of use, and is poured from the vessel to inactivate the battery. This battery is used for emergency light.

A larger version of this battery is available in which the electrolyte is an aqueous solution of an alkali metal hydroxide, such as potassium or sodium hydroxide. Pumps are employed to circulate the electrolyte within the battery and to provide for heat dissipation. The electrolyte is open to atmosphere, and venting the battery is not a problem.

An advantage in the use of a metal-air couple of this type over other primary cell or dry cell batteries is that the cathode uses oxygen derived from air giving a metal-air couple a higher energy density. An aluminum-air couple has the further advantage over, for instance, a zinc-air couple or an iron-air couple, in that the aluminum-air couple has a higher cell voltage and higher energy yield per unit weight or unit volume of the anode. In addition, the anode reaction product in an aluminum caustic electrolyte cell is a fine precipitate and is easy to handle compared to the gell-like reaction product of a zinc-air cell. However, an aluminum-air couple has the disadvantage that it can generate a large amount of heat which can exceed the heat capacity of the electrolyte within the battery cell within a short period of time and cause the electrolyte to boil.

Accordingly, it is an object of the present invention to provide a compact, bipolar, aluminum-air battery which is activated by the addition of an aqueous electrolyte to a vented, essentially enclosed electrolyte chamber for each battery cell.

It is also an object of the present invention to provide such an aluminum-air battery wherein the aluminum anode provides a heat exchange surface which is effective for the dissipation of heat generated in the battery cell.

SUMMARY OF THE INVENTION

The present invention resides in an aqueous electrolyte aluminum-air battery comprising one or more cells, each cell comprising a frame defining an electrolyte chamber. The frame is made of a rigid material inactive to the electrolyte. Each cell comprises a consumable plate-like aluminum anode and an air cathode spaced from the anode by said electrolyte chamber. The air cathode is impervious to the flow of aqueous electrolyte. Means are provided for admitting an aqueous electrolyte into the electrolyte chamber. A vent exposes the electrolyte chamber to atmosphere. A hydrophobic membrane impermeable to the passage of electrolyte at the pressure within the cell but permeable to the passage of hydrogen closes said vent.

In an embodiment of the present invention, each cell anode has a surface exposed to the flow of convective air. The amount of surface exposed is effective to dissipate heat generated at the anode.

Preferably, the aluminum-air battery of the present invention comprises a plurality of cells mounted in a bipolar array. The battery comprises spacers between the battery cells to provide inter-cell air spaces for the flow of air across the anode of one cell and the air cathode of an adjacent cell. The spacers are electrically conductive and in electrical contact with the anode of one cell and the air cathode of an adjacent cell.

Preferably, the aluminum anode is dimensioned with fin surfaces extending beyond the confines of each cell frame. Only relatively small fins compared to the overall size of the anode are required to dissipate additional heat from the electrolyte chamber.

In another preferred embodiment of the present invention, the electrolyte is an aqueous caustic solution containing a surfactant. A preferred surfactant is an anti-foaming agent.

In the practice of the present invention, it is contemplated that the electrolyte can be added to the battery cells in measured amounts to activate the battery for predetermined amounts of time, the battery becoming inactive upon consumption of electrolyte. Activation of the battery can be resumed by replacing spent electrolyte with fresh electrolyte.

BRIEF DESCRIPTION OF THE DRAWINGS

Further features of the present invention will become apparent to those skilled in the art to which the present invention relates from reading the following specification with reference to the accompanying drawings, in which:

FIG. 3 is a section, elevation, side view of a battery cell of the battery of FIG. 1;

FIG. 4 is a section view taken along line 4—4 of FIG. 3; and

FIG. 5 is a section view taken along line 5—5 of FIG. 3.

DESCRIPTION OF A PREFERRED EMBODIMENT

Figure 1:
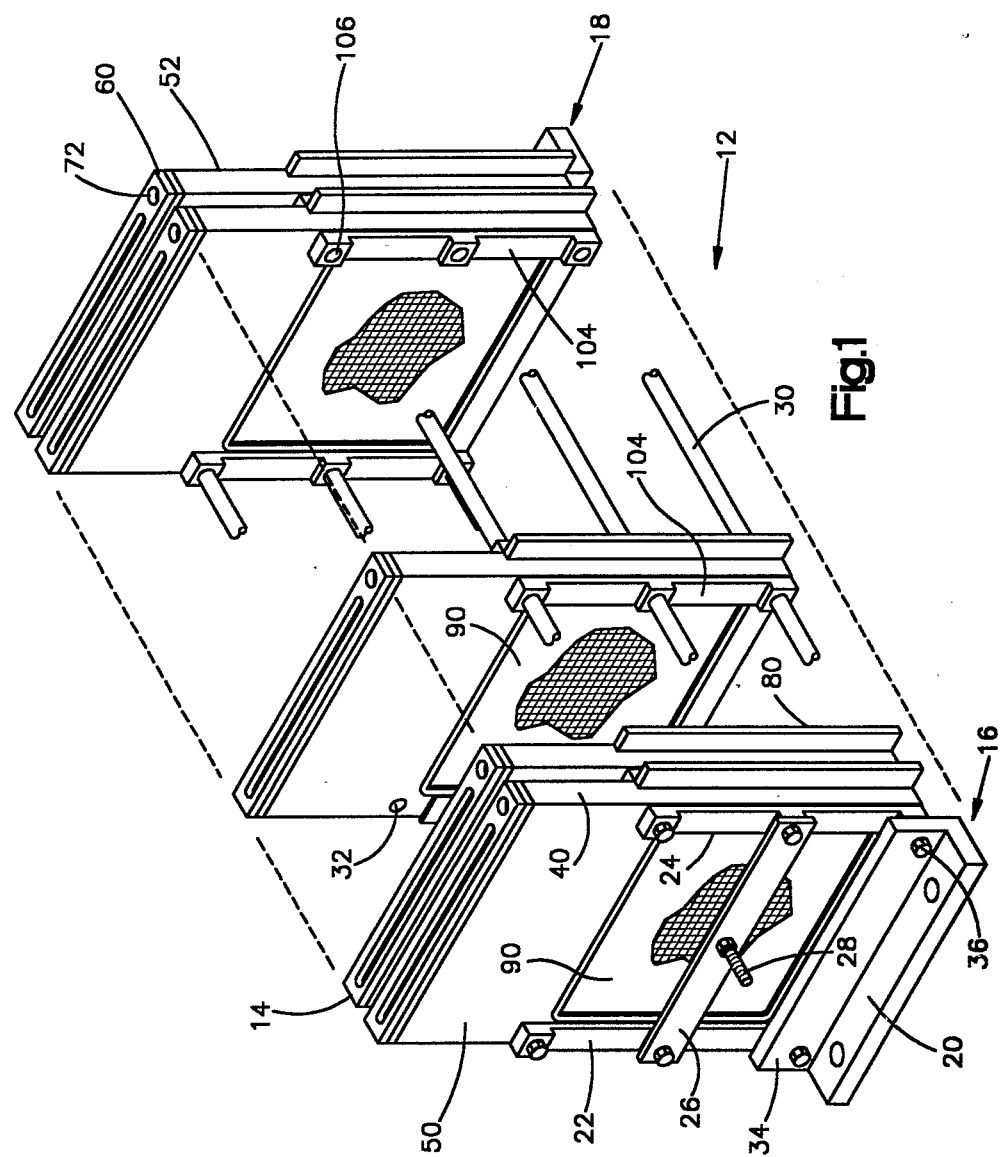
FIG. 1 is an isometric view of an aluminum-air battery embodying the present invention.

FIG. 1 shows an aluminum-air battery 12 of the present invention. The battery 12 comprises a plurality of cells 14 in stacked, contiguous relationship held between bulkheads 16, 18. The bulkheads 16, 18 are optional and function to support the stack of battery cells 14 spaced above ground level and to insulate the battery stack from ground. Each bulkhead comprises an L-shaped lower support member 20 and spaced apart arms 22 and 24 which extend upwardly from opposite ends of the lower support member 20. A metal current collector bar 26 extends between the arms 22 and 24, the bar 26 supporting in its center a battery terminal 28. The lower support members 20 are of a non-conductive or insulating material, whereas the rest of each bulkhead 16, 18 is made of a conductive material. Examples of plastics which are non-conductive and suitable for use as support members 20 are moldable or machinable plastics such as chlorinated polyvinyl chloride (CPVC), polysulfone, polytetrafluoroethylene, and acrylonitrile-butadiene-styrene (ABS). Only bulkhead 16 on the left-hand side of battery 12 is fully shown in FIG. 1, bulkhead 18 on the righthand side of the battery having essentially the same configuration.

The entire battery stack is assembled by extending tie rods 30 through each of the bulkheads 16, 18 and the battery cells 14, in apertures 32 (FIG. 4). In the embodiment shown in FIG. 1, there are six tie rods 30 in spaced apart relationship defining a generally rectangular configuration, with three of the tie rods along each opposite side of the battery cell stack. The lower tie rods extend through the upstanding flanges 34 of the lower support members 20 in such a way as to hold the stack of the battery cells 14 spaced from ground level. Tie rod heads 36 connected to opposite ends of the tie rods 30 hold the battery stack and bulkheads 16, 18 together.

The use of tie rods 30 is optional. The battery cells 14 can be held together by other means, for instance, by simply gluing the battery components together.

Figure 2:
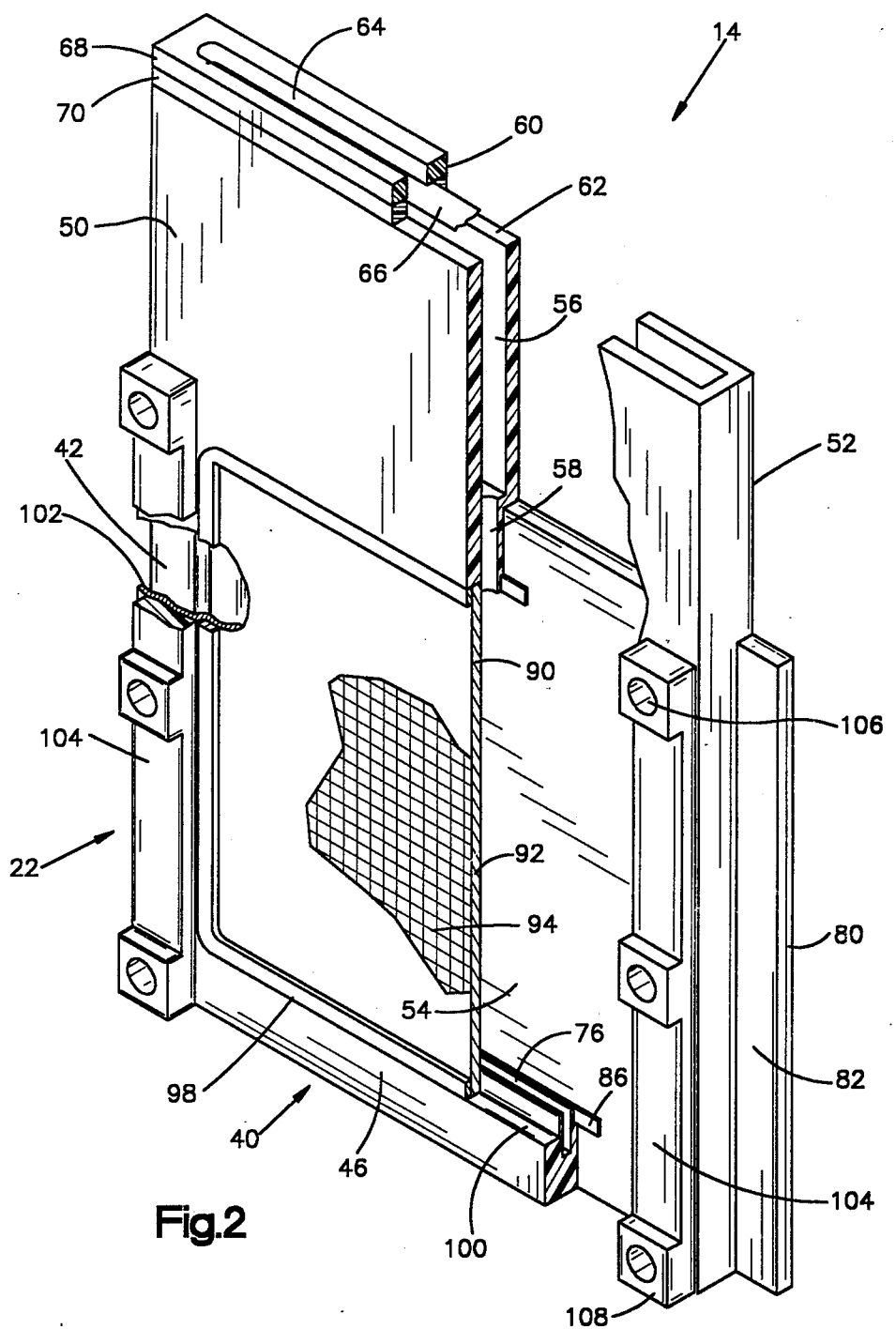
FIG. 2 is an isometric partial section view of the cathode side of a battery cell of the battery of FIG. 1.

The battery elements, some of which have been referenced in FIG. 1, will now be more particularly identified by referring to FIGS. 2 through 5, each battery cell 14 comprises a rectangular frame 40 somewhat in the shape of a window frame having side walls 42, 44 and bottom and top walls 46, 48 (FIGS. 2, 3 and 4). The frame 40 is formed or molded preferably as one piece from a material of construction which is non-reactive with chemicals present in the battery cell. Useful materials of construction include ceramics, as well as plastics including chlorinated polyvinyl chloride and polyphenylene oxide blends with polystyrene, and combinations of the foregoing. The frame surface 50 facing the front of the battery stack in FIG. 1 is the cathode side of each battery cell and the frame surface 52 facing in the opposite direction is the anode side of each battery cell.

Referring to FIGS. 3 and 4, the frame side walls 42, 44 and bottom and top walls 46, 48 define a generally rectangular electrolyte chamber 54 which extends, as shown in FIG. 3, between the cathode side 50 and the anode side 52. The top wall 48 is hollowed at 56 to provide an electrolyte reservoir separate from the electrolyte chamber 54. Passages 58 drilled in the top wall 48 extend vertically between the electrolyte reservoir 56 and the electrolyte chamber 54 communicating the electrolyte reservoir 56 with the electrolyte chamber 54.

A reservoir seal block 60 (FIGS. 2-4) seals the top of the electrolyte reservoir 56. The seal block 60 has an elongated rectangular shape and is fastened to the top edge 62 (FIG. 2) of the frame top wall 48. The seal block 60 can be fastened to the top edge 62 by any suitable adhesive, solvent welding, or other means. An elongated vertically extending vent slot 64 extends longitudinally in the seal block 60 from adjacent the left-hand side of the seal block substantially the full length of the block. A porous membrane 66 is positioned across the vent slot opening closing off the slot. The membrane is a hydrophobic/gas permeable material which is porous to the passage of gases such as hydrogen gas, but is impermeable to the passage of water vapor and electrolyte. The purpose of the membrane is to keep electrolyte and water vapor in the reservoir 56 and the electrolyte chamber 54, but allow the escape of gases that may be generated within the electrolyte chamber 54. If hydrogen gas, formed from parasitic corrosion of the anode by the caustic electrolyte, is not allowed to vent, it may overpressure the cell and possibly damage the air cathode. Additionally, the hydrogen may form a gas pocket between the electrodes which could reduce the battery output.

One membrane 66 employed in the practice of the present invention is a membrane marketed by Norton Performance Plastics under the Trademark ZITEX. This is a fibrous-porous form of polytetrafluoroethylene (PTFE) which is inert to many chemicals including caustics, is thermally stable, and has non-wetting (hydrophobic) characteristics. The material has many filtering and venting applications, and has been used for venting lead/acid batteries.

In the embodiment illustrated, the seal block 60 is comprised of two pieces, an upper piece 68 and a lower piece 70. The porous membrane 66 is sandwiched between the two pieces, which are fastened together by a suitable adhesive, solvent welding, or other means, holding the porous membrane 66 in sandwiched relationship between the two pieces.

A fill hole 72 (FIGS. 1 and 4) is bored vertically through the seal block and Provides access to reservoir 56 by which electrolyte fluid is introduced into the reservoir, and from the reservoir into the electrolyte chamber 54 by means of passages 58. Following filling, the fill hole is closed by a cap 74 (FIG. 4) threaded into the fill hole or otherwise held within the fill hole.

In practice, the reservoir 56 may be filled with electrolyte solution in addition to the electrolyte chamber 54. This is desired because electrolyte added to the reservoir is circulated by convection to chamber 54 increasing the capacity of the battery. When the electrolyte becomes saturated with aluminate from the reaction of the anode, the cell output will drop to zero.

At the bottom of the electrolyte chamber 54 in the frame bottom wall 46, an elongated sump 76 is formed. The sump 76 functions as a repository for the collection of solid aluminate discharge product from the reaction at the anode.

A solid aluminum plate anode 80, which has a rectangular flat configuration, covers the anode side 52 of the electrolyte chamber 54. The plate 80 can be comprised of any suitable high performance, aluminum alloy having low polarization and low parasitic corrosion values. Such alloys are well known and are disclosed, by way of example, in U.S. Pat. No. 3,379,636, in U.S. Pat. No. 4,751,086, and in patents cited therein. It is possible, by suitably alloying the aluminum, to obtain very low corrosion current values, for instance, ten (10) milliamps per square centimeter. The disclosures of U.S. Pat. Nos. 3,379,636 and 4,751,086 are incorporated by reference herein.

Apertures drilled along the sides of the plate are aligned with apertures 32 in the battery cells. These apertures hold the plates securely on the tie rods 30. A sealing adhesive or gasket 86 (FIGS. 2-5) is positioned between the anode plate 80 and the anode side 52 of each frame 40 to seal the anode to the frame 40 and prevent the leakage of electrolyte from the electrolyte chamber 54 on the anode side of the frame. The adhesive or gasket should be stable to caustic. One suitable adhesive is an aluminum filled epoxy cement marketed by Devcon Corporation under the trademark Devcon. If a gasket is used, it should be resilient, typically low durometer. Suitable gasket materials are closed cell EPDM, neoprene or vinyl.

An air cathode 90 seals the cathode side 50 of the electrolyte chamber 54. High energy and high power yields are achieved in the present invention by the use of a high performance air cathode in combination with the high performance anode.

Details of a high performance air cathode suitable for use in the present invention are disclosed in prior Pat. No. 4,756,980, assigned to assignee of the present application. The disclosure of Pat. No. 4,756,980 is incorporated by reference herein. The air cathode comprises a thin, single sheet layer of catalyzed carbon particles, in mixture with 10 to 50 weight percent of hydrophobic polymeric binder containing a fluorocarbon polymer. The sheet is free from hydrophilic bulk metal internal to the sheet. Either or both the front or back flat surface of the sheet has pressed into it a foraminous current-conductive metal mesh or screen. The metal screen is exposed at the sheet surface but is embedded into the surface. The metal screen is then sintered to the sheet at high temperature. Materials suitable for cathode screens are silver plated copper wire, preferably copper wire which is nickel plated with a silver plate top layer.

The sheet of catalyzed carbon particles and hydrophobic polymeric binder, being free of hydrophilic metal, has an open, porous construction receptive to the flow of air, but at the same time one that is impermeable to the flow of aqueous electrolyte into the sheet pores. The metal screen gives the sheet mechanical strength and also functions as a metallic current collector. For imparting even more strength to the air cathode, the cathode can be "double gridded" as disclosed in Pat. No. 4,756,980, with metal screen on both sides.

Another suitable high performance air cathode is also disclosed in U.S. Pat. No. 4,615,954, also assigned to the assignee of the present application. The air cathode comprises at least two bonded composite layers, one of which is a form-stable conductive wetproofing layer while the other is a thin active layer containing active carbon particles and having a high internal surface area, e.g., more than 1,000 $m^2$/gram. The disclosure of this patent is also incorporated by reference herein.

In the embodiment illustrated, referring particularly to FIG. 2, the air cathode 90 is shown schematically as sheet 92 which it will be understood will usually be composed of a gas supplying layer as well as an active layer, with the active layer having catalyst containing carbon particles in mixture with a polymeric binder. The air cathode 90 also has an outer foraminous, metallic, current collector screen 94 embedded in the sheet 92. The sheet 92 and screen 94 are secured to the inner side of a rectangular cathode frame 98. The cathode frame 98, in turn, is secured within a rectangular seat 100 (FIG. 2) cut into the cathode side 50 of frame 40 around the periphery of the electrolyte chamber 54. The cathode frame 98 is sealed into the seat 100 by the same epoxy cement used for the anode or by other suitable means, so that electrolyte does not flow from the electrolyte chamber 54 on the cathode side of the battery cell 14.

The foraminous metal current collector screen 94 has a width dimension so that it extends beyond the side walls of the cathode frame 98, as shown in FIGS. 2 and 5, providing contact tabs 102. Between each battery cell 14, there is positioned a pair of metallic current conducting spacers 104 in the shape of upright bars. These spacers are similar in configuration to the upright bulkhead arms 22, 24 and are provided with apertures 106 (FIG. 2) which are aligned with those of the battery cell 14 allowing the spacers to be mounted on the assembly tie rods 30. Each of the spacers is provided with a raised surface 108. The raised surfaces 108 are positioned so that they connect the air cathode 90 with the plate anode 80 of an adjacent cell 14 towards the cathode end of the battery 12 (FIG. 1). The opposite side of each spacer 104 is in contact with the air cathode contact tabs 102. This provides an electrical connection between the cathode of one cell and the anode of the adjacent cell. The construction of the spacers 104, in addition, maintains a separation between one cell and the adjacent cell which permits the flow of air into the space between the battery cells from all sides and into the air cathode 90.

This construction provides oxygen to the cathode 90 and at the same time a convective air current which flows across the face of the aluminum plate anode 80 removing heat generated at the anode. The heat from the anode helps to increase the convection currents in the space between the cells provided by the spacers 104. Under ambient air conditions, sufficient heat may be removed through the plate anode 80 so that forced air circulation in the space between adjacent cells can be avoided. However, forced air circulation may be desirable and especially when operating with air at elevated temperature.

With the air flow on one side, and with the electrolyte present on the other, the aluminum plate anode 90 serves as a liquid-air heat exchange surface. Because of the cell construction, the air cathode 90 can also serve this purpose. During operation at ambient air temperature, it has been found that normal convection currents will provide desirable cooling for inter-cell spacings of from about 0.2 inch to about 0.4 inch, using at least substantially square anodes measuring from about one to two inches on a side. A ratio of inter-cell spacing to anode side dimension of from about 1:2 to about 1:10, and more typically from about 1:4 to about 1:8 will usually be serviceable under such conditions. Generally, where more elevated air temperature conditions might be encountered, such spacing to anode side dimension will be maintained, but forced air circulation will be utilized.

Without a means for dissipation of heat, the heat build-up can quickly exceed the heat capacity of the electrolyte and cause the electrolyte to boil. By way of example, the cell efficiency is about 50 %. For each watt of power produced, a watt of heat is generated. But aluminum is a good heat conductive material. Also, as shown in the Figures, the size and shape of the anode 80 is such that it not only will completely cover the electrolyte chamber 54, but preferably can extend even beyond the sidewalls 42 and 44 of the frame 40 providing exposed extensions 82. In the embodiment shown, the amount of the extension, or size of the extensions 82, is effective to provide a small surface area, e.g., somewhat in the nature of a fin, for additional dissipation of heat generated at the anode.

The provision of even small extensions 82 beyond the side walls 42 and 44 provides further heat dissipation. In the embodiment of the drawings, by way of example, the plate size is about two inches by a side dimension of two and one-half inches. Extensions of about $\frac{1}{4}$ inch to about $\frac{1}{2}$ inch in dimension extending beyond the side walls 42 and 44 were found to be sufficient for further heat dissipation. Thus, on the order of about 10 to about 30 percent of the surface area of the anode 80 may advantageously comprise the extensions 82.

To assemble a cell stack, it is a simple matter to preassemble the battery cells 14 (except for the anode plate 80) and then to mount a series of the battery cells 14 with accompanying anode plates 80 and spacers 104 in the desired sequence on the six tie rods 30. Following mounting of the battery cells on the tie rods 30, it is then a simple matter to install the bulkhead arms 22 and 24 at opposite ends of the battery stack, and then to install the lower supports 20. The entire assembly is then held together simply by affixing the tie rod heads 34 to the tie rods. Alternatively, the anodes 80 can be glue affixed to the cell frames 40 in a preassembly step prior to assembly of the cells 14 on the tie rods 30.

Referring to FIG. 1, again only the bulkhead 16 and the L-shaped lower support member 20 at the cathode end of the battery 12 are fully shown. At the opposite anode end of the battery 12, the configuration is similar to that at the cathode end except that it is adapted for contact with an anode plate 80 and to provide an anode terminal.

Following assembly of a battery stack, the battery is activated by the introduction of electrolyte into the electrolyte fill holes 72 of each battery cell 14. It is contemplated, in the practice of the present invention, that the electrolyte can be provided in measured amounts, for instance, in pouches designed to introduce a predetermined amount of electrolyte to each battery cell, depending upon the length of time during which activation of the battery is required. The electrolyte chamber 54 of each cell must be completely filled. The reservoir 56 of each cell can be completely filled or only partially filled.

Alternatively, the cells can be simultaneously filled from a manifold or other distribution device communicating with the fill holes of all of the cells.

In the practice of the present invention, the electrolyte is an aqueous liquid, e.g., a saline or a caustic liquid. Representative electrolytes include 6 to 10 molar aqueous sodium hydroxide or 6 to 10 molar aqueous potassium hydroxide solution, with about a 7 to 8 molar potassium hydroxide solution being preferred. A stannate solution such as an aqueous solution of sodium stannate, is added as a corrosion inhibitor, e.g., to provide the electrolyte with an about 0.02 to 0.2 molar solution of the stannate. An electrolyte with an about 0.04 to 0.06 molar solution of sodium stannate is preferred. During the period of power production, hydrogen bubbles form at the anode due to direct reaction of the anode with the aqueous electrolyte. The hydrogen bubbles are very small and therefore the bouyant force of hydrogen in an electrolyte is relatively low. To facilitate de-gasification of the electrolyte, it is a concept of the present invention to add a small amount of a surfactant to the electrolyte. One surfactant successfully employed for caustic electrolyte solutions is an anti-foaming agent marketed under the trademark "DOWEX 1410" by Dow Chemical Co. This anti-foaming agent is a perfluorinated hydroxy ethylene. The compound is conventionally marketed by Dow Chemical Co. as an anti-foaming agent for caustic compositions. It is used in the present invention in small amounts, for instance at a level of from about 0.5 part per million (ppm) to about 20 ppm, with about 2–3 ppm being preferred.

An aspect of the present invention is the discovery that despite the use of a small amount of a surfactant, the hydrophobic porous membrane 66 was still effective in retaining electrolyte and water vapor within the electrolyte chamber 54 and reservoir 56.

Although the battery of the present invention is not rechargeable similar to a secondary battery, it is a simple matter to recharge the battery. When electrolyte replacement is chosen for battery recharging, no battery disassembly will be required. Battery recharging may include replacement of the aluminum anodes for the battery cells when the same become spent or too highly corroded. This is accomplished by simply disassembling the battery stack by removing the tie rod heads and tie rods from the stack. On removal of the tie rods, the spent anodes can be replaced by fresh anodes, and the stack is then reassembled following the sequence set forth above with regard to initial assembly of the battery stack. This provides a battery which has a dramatically increased lifetime.

In the embodiment disclosed in the drawings, the battery cells are vented only at the top through the porous membranes 66. In this embodiment, the battery cells are position sensitive in the sense that the cells have to be positioned so that the vent slots 64 are at the battery's highest point. As an alternative, it is possible to provide vent slots 64 on all four sides of the cell frames 40, covered with the porous membrane 66, thus decreasing the cell's position sensitivity. A further alternative is to make the entire frame 40 of the hydrophobic, gas permeable membrane material.

The battery cells 14 in the embodiment illustrated are connected in series in the battery 12. It is contemplated that the batteries of the present invention will have principal use as a temporary power source where a high power output and light weight are essential. Examples of applications are electronic systems such as radio transmitters, and equipment for sonobuoys. The batteries would normally be used during periods when the primary power source is interrupted.

EXAMPLE 1

In this Example, ten cells 14 were assembled into a battery stack and were connected in series to form a bipolar aluminum-air battery as shown in FIG. 1. The inter-cell gap was 0.25 inch. The electrolyte chamber dimensions were about one inch by one inch with an electrode gap of about 0.187 inch. The overall length of the battery was about 7.88 inches. A cathode of the type disclosed in U.S. Pat. No. 4,756,980 was used. The aluminum anode used, which had no extensions, measured, in inches, 1 7/16×1 7/16×0.09. The electrolyte was a 7.5 molar aqueous potassium hydroxide solution containing 0.1 mole of sodium stannate and 2-3 ppm "Dowex 1410" anti-foaming agent. About 5.5 milliliters of electrolyte was added to each cell.

The battery had an open circuit voltage of 15.68 initially, and an elapsed run time of about ninety minutes before the electrolyte was exhausted. The battery was cooled by air convection with air at ambient temperature (72° F.) with both the anode and the cathode serving as (electrolyte) liquid-air heat exchange surfaces. The temperature of the electrolyte was maintained under these conditions within the range from about 33° C. to about 62° C.

EXAMPLE 2

In this Example, the battery of Example 1 was recharged by replacing spent electrolyte with fresh electrolyte. There was no anode replacement. The battery had an initial open circuit voltage of 15.52. The total run time was eighty-one minutes. The current production was 2.075 amp hours, or 0.377 amp hours per milliliter of electrolyte.

The battery was again recharged and gave an initial open circuit voltage of 15.62 volts. The battery ran for about ninety-two minutes and gave a current output of about 2.3 amp hours, or 0.418 amp hours/milliliter of electrolyte.

In both the second and third runs, the temperature of the electrolyte remained below about 70° C. The battery was determined to have an efficiency, defined as actual anode weight loss divided by theoretical anode weight loss, of about 97.2 %.

EXAMPLE 3

A single battery cell of the battery of Example 1 was discharged under constant resistance and compared with several commercially available single cell batteries. The specific energy density and power densities are compared below:

| Battery | Weight Grams | Watt-Hr | Watt-Hr Per Gram | Watt-hr Per Cubic Inch | Battery Size |
|---|---|---|---|---|---|
| Alkaline | 143 | 4.2 | 0.029 | 0.95 | D |
| Ni-Cd | 65 | 2.03 | 0.031 | | D |
| Al/Air | 30.0 | 3.175 | 0.106 | 1.27 | 2" × 2" by 0.5" approx. |

From the above description of a preferred embodiment of the invention, those skilled in the art will perceive improvements, changes and modifications. Such improvements, changes and modifications within the skill of the art are intended to be covered by the appended claims.

We claim:

1. A cell adapted for utilization in an aqueous electrolyte aluminum-air battery, said cell comprising:
a frame defining an electrolyte chamber having opposed sides, said frame being made of a rigid insulating material inactive to said electrolyte;
a consumable aluminum anode having a surface exposed to air currents external of said cell;
an air cathode spaced from said anode by said electrolyte chamber;
means for admitting electrolyte solution into said electrolyte chamber;
vent means exposing said electrolyte chamber to atmosphere;
and a hydrophobic membrane permeable to the passage of hydrogen closing said vent means.

2. The cell as set forth in claim 1, wherein said anode is a flat plate, the dimensions of said plate being effective for dissipation of heat generated at said anode.

3. The cell as set forth in claim 2, wherein said plate anode comprises extended surfaces extending beyond the confines of said frame, said extended surfaces having a configuration effective for the dissipation of more heat generated at said anode.

4. The cell as set forth in claim 3, wherein said extended surfaces constitute from about 10 to about 30 percent of the total surface area of said anode.

5. The cell as set forth in claim 1, wherein said electrolyte is an aqueous saline or caustic electrolyte.

6. The cell as set forth in claim 1, wherein said electrolyte is a caustic solution comprising a surfactant, a corrosion inhibitor, or both.

7. The cell as set forth in claim 6, wherein said surfactant is an anti-foaming agent.

8. The cell as set forth in claim 1, wherein said hydrophobic membrane comprises fibrous polytetrafluoroethylene.

9. The cell as set forth in claim 1, including an electrolyte reservoir spaced from said electrolyte chamber, and means communicating said reservoir with said chamber.

10. The cell as set forth in claim 1, wherein said cell is recharged by addition of electrolyte to said electrolyte reservoir.

11. The cell as set forth in claim 1, wherein said cell is recharged by replacement of said anode.

12. A bipolar aluminum-air battery comprising a plurality of the battery cells as set forth in claim 1, assembled in-series, including spacer means between each battery cell dimensioned for circulation of air to each battery cell air cathode and across the exposed surface of each battery cell plate anode.

13. The battery of claim 12, wherein said spacer means are electrically conductive and in contact with the air cathode of one cell and the anode of an adjacent cell.

14. The battery of claim 12, wherein said cell anode has a surface exposed to air flow in an inter-cell space provided by said spacer means, the dimensions of the anode exposed surface being effective for the removal of heat generated at the anode.

15. The battery of claim 14, wherein said spacer means provide an inter-cell spacing ratio relative to an anode side dimension of from about 1:2 to about 1:10.

16. The battery of claim 14, wherein said air flow is convective air flow.

17. The battery of claim 14, wherein said air flow is forced air flow.

18. A cell for an aqueous electrolyte aluminum-air battery comprising:
a frame defining an electrolyte chamber having opposed sides, said frame being made of a rigid insulating material inactive to said electrolyte;
a consumable aluminum plate anode;

means affixing said anode to one side of said electrolyte chamber, said anode having a surface exposed to convective air currents external of said cell;

an air cathode;

means affixing said air cathode to the opposite side of said electrolyte chamber;

means for admitting a caustic electrolyte solution into said electrolyte chamber, said electrolyte solution containing a surfactant;

vent means exposing said electrolyte chamber to atmosphere;

and a hydrophobic membrane permeable to the passage of hydrogen closing said vent means, said hydrophobic membrane retaining electrolyte solution and water vapor in said electrolyte chamber;

the dimensions of said anode being effective for the dissipation of heat generated at said anode.

19. In a cell for an aluminum-air battery wherein electrolyte is enclosed in a chamber and wherein the aluminum anode serves to contain said electrolyte in said chamber, the improvement comprising exposing a surface of said anode to air flow, the amount of surface exposed being effective to dissipate heat generated at said anode.

20. The cell of claim 19, wherein said air flow is convective air flow or force

21. The cell of claim 19, wherein said air flow passes in heat exchange relationship across the exposed surface of said anode.

22. The cell of claim 19, wherein said anode is in the form of a plate comprising extended surfaces extending beyond the confines of the electrolyte chamber walls and said extended surfaces constitute from about 10 to about 30 percent of the total surface area of said anode.

23. The cell of claim 19, comprising vent means venting said electrolyte chamber and a hydrophobic membrane permeable to the passage of hydrogen closing said vent means.

24. The cell of claim 23, wherein said hydrophobic membrane comprises fibrous polytetrafluoroethnylene.

25. An aluminum-air battery comprising a plurality of battery cells as set forth in claim 19, wherein electrolyte is enclosed in a chamber of each cell and wherein the aluminum anode of each cell serves to contain said electrolyte in said chamber, said battery including a surface of each anode exposed to air flow, with the amount of surface exposed being effective to dissipate heat generated at said anode.

26. The battery of claim 25, including spacer means between the battery cells to provide inter-cell air spacers bounded on one side by a cell anode and on the opposite side by an adjacent cell air cathode, the air flow in each inter-cell space passing in heat exchange relationship across the anode exposed surface and supplying air to said air cathode.

27. The battery of claim 26, wherein said spacer means are electrically conductive and in electrical contact with said anode and said adjacent cell air cathode.

28. The battery of claim 26, wherein said spacer means provide an inter-cell spacing ratio relative to an anode side dimension of from about 1:2 to about 1:10.

29. In an aluminum-air battery comprising at least one cell wherein electrolyte is enclosed in a chamber in said cell with an aluminum anode on one side and an air cathode on an opposite side, spaced apart one from the other and serving to contain said electrolyte in said chamber, the improvement comprising a sump at the bottom of said chamber extending between said anode and said cathode, said anode having a surface exposed to air currents external of said cell.

30. The battery of claim 29, wherein said sump comprises an elongated slot extending along the length of said chamber.

* * * * *